April 13, 1943.     H. E. STOVER     2,316,654
CONVEYER FOR CONTAINER SEALING APPARATUS
Filed Feb. 6, 1942     6 Sheets-Sheet 1

INVENTOR
Harry E. Stover
BY
Corbett, Mahoney & Miller
ATTORNEYS

April 13, 1943. H. E. STOVER 2,316,654
CONVEYER FOR CONTAINER SEALING APPARATUS
Filed Feb. 6, 1942 6 Sheets-Sheet 2

Fig.3

INVENTOR
Harry E. Stover.
BY
ATTORNEYS

April 13, 1943.  H. E. STOVER  2,316,654
CONVEYER FOR CONTAINER SEALING APPARATUS
Filed Feb. 6, 1942  6 Sheets-Sheet 3

INVENTOR
Harry E. Stover
BY
ATTORNEYS

Fig. 7

April 13, 1943.  H. E. STOVER  2,316,654
CONVEYER FOR CONTAINER SEALING APPARATUS
Filed Feb. 6, 1942  6 Sheets-Sheet 6

INVENTOR
Harry E. Stover.
BY
Corbett, Mahoney & Miller
ATTORNEYS

Patented Apr. 13, 1943

2,316,654

UNITED STATES PATENT OFFICE 2,316,654

CONVEYER FOR CONTAINER SEALING APPARATUS

Harry E. Stover, Connellsville, Pa., assignor to Anchor Hocking Glass Corporation, Lancaster, Ohio, a corporation of Delaware Application February 6, 1942, Serial No. 429,781

26 Claims. (Cl. 198—162)

My invention relates to conveyer for container sealing apparatus. It has to do, more particularly, with an apparatus for applying closures to containers, such as food containers and including jars, bottles, cans, et cetera, and sealing them on the containers.

In my co-pending application Serial No. 418,401, filed November 8, 1941, I disclose a machine for applying closures to and sealing them upon containers. The machine disclosed in said application comprises mainly a continuously moving conveyer unit, a cap-feeding and applying unit and a sealing unit. The containers are moved successively into association with the cap-feeding and applying unit where a cap is loosely applied to the upper end of each container and are then moved to the sealing unit where the cap is sealed on the container. At the cap-feeding and applying unit, which is disclosed in detail in my co-pending application Serial No. 427,966, filed January 23, 1942, the upper end of the container engages the skirt of a cap, held stationarily in inclined relationship by said unit, and serves to withdraw the cap from said unit and apply it loosely to the upper end of the container. When the upper end of the container, which is being moved continuously by the conveyer past the cap-feeding and applying unit, engages the skirt of the cap, there is a force set up which tends to tilt the container rearwardly on the conveyer in a direction opposite to the direction of movement of the conveyer. The sealing unit of the machine embodies a reciprocable sealing head which is forced downwardly into engagement with the cap carried by a container moved into association therewith. When the sealing head is moved downwardly into contact with the cap on the container, the container is gripped between the sealing head and the conveyer which continues to move beneath the container and relative thereto. Since the top of the container is gripped by a stationary member, the sealing head, and since the bottom of the container is gripped by a moving member, the conveyer which slides therebeneath, there is a tendency for the containers to be upset, in a direction opposite to the direction of movement of the conveyer. Thus, with said machine, there are two points where there is a tendency for the containers to be upset in a direction opposite to the direction of movement of the conveyer. This is particularly true when the machine is used for sealing containers which are relatively tall and of a narrow diameter.

One of the objects of my invention is to provide mechanism for use with a machine of the type indicated which will serve to prevent overturning of the containers at the cap-feeding and applying unit and at the sealing unit.

Another object of my invention is to provide mechanism of the type indicated in the preceding paragraph which though very efficient in operation is very simple.

Another object of my invention is to provide mechanism of the type indicated which can be adjusted readily for use with containers of various sizes.

In its preferred form my invention contemplates the provision of a holding belt arrangement for gripping the containers while they are in association with the cap-feeding and applying unit and with the sealing unit. This holding belt arrangement comprises holding belts disposed on opposite sides of the container-supporting conveyer which are driven at the same linear speed as the conveyer. These belts are disposed in association with the cap-applying unit and the sealing unit and are adapted to grip the containers intermediate the height thereof to prevent tilting thereof. The belts are arranged in two units which overlap each other. The belts of the first unit are disposed adjacent the cap-applying unit and are supported in such a manner that they may be moved toward each other. I provide resilient means for normally urging these belts toward each other so that they will grip automatically a container moved therebetween. Means is also provided for adjusting the spacing of these belts for use with containers of different diameter. The other belt unit is disposed adjacent the sealing unit and is adapted to receive and grip each container as it passes from the first-named holding belt unit. These belts of the second unit are also adjustable towards and from each other so that the unit can be used with containers of various diameters.

The preferred embodiment of my invention is illustrated in the accompanying drawings wherein similar characters of reference designate corresponding parts and wherein.

Figure 1:
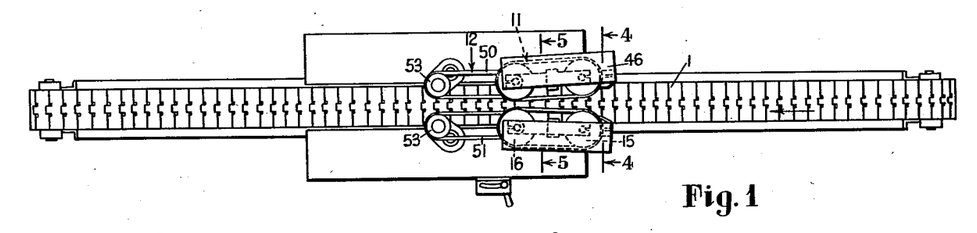
Figure 1 is a plan view of a container-sealing machine showing my holding belt arrangement associated therewith.
Figure 2:
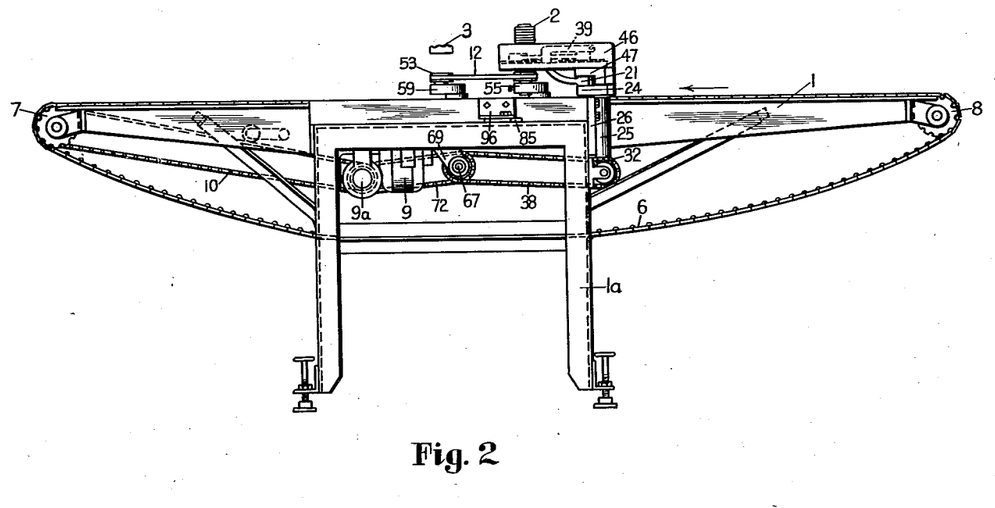
Figure 2 is a side elevational view of the machine shown in Figure 1.
Figure 8:
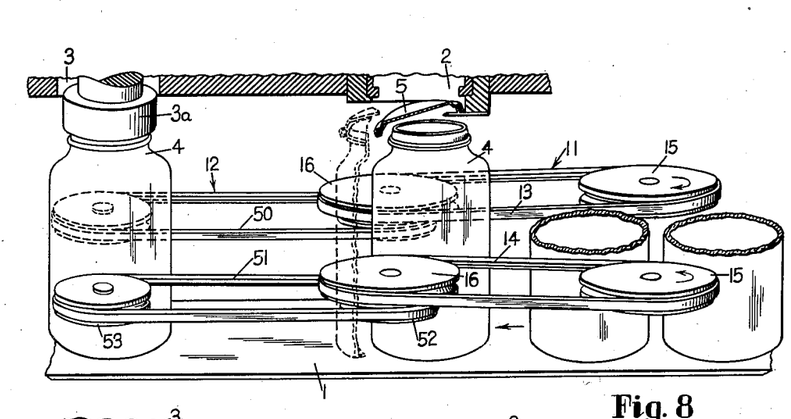
Figure 8 is a more or less diagrammatic view in perspective illustrating the action of the belts at the cap-applying unit and the sealing unit.
Figure 9:
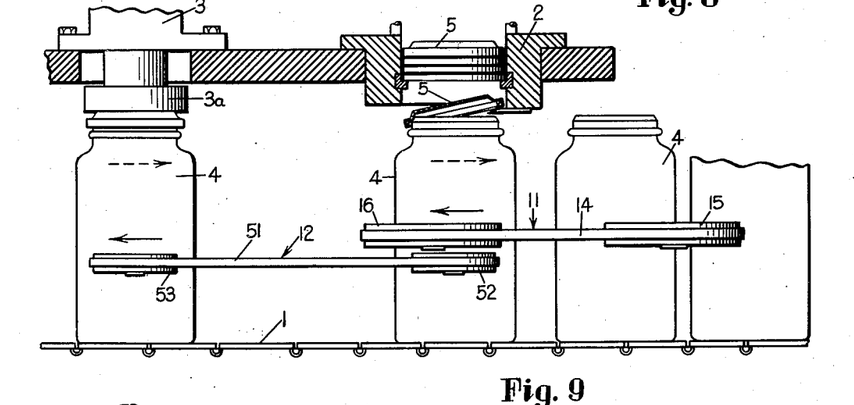
Figure 9 is a side elevational view, more or less diagrammatic, illustrating the action of the belts at the two units.
Figure 10:
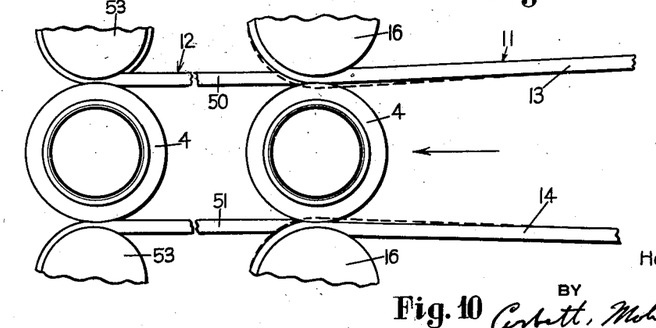
Figure 10 is a diagrammatic view in plan illustrating the action of the belts at the two units.

With reference to the drawings, I have illustrated my invention associated with a sealing machine of the type disclosed in my co-pending application Serial No. 418,401. This machine comprises generally a table 1a supporting a horizontal conveyor unit 1 on its upper end, as shown in Figure 2. Above this conveyer in properly spaced relationship a cap-feeding and applying unit 2 and a sealing unit 3 are supported, as disclosed in detail in Serial No. 418,401. The conveyer unit 1 may be of any suitable type and is driven continuously. As described in said application, the containers 4 are placed indiscriminately on the conveyer 1 and are moved in the direction of the arrows (Figures 1 and 2) by the conveyer. At the unit 2, each container moved into association therewith withdraws a cap 5 and at the sealing unit 3, this cap is forced into sealed position on the container. The unit 2 is illustrated in detail in my co-pending application Serial No. 427,966, filed January 23, 1942, and serves to support a cap in inclined position, as shown in Figures 8 and 9, so that the skirt of the cap will be engaged by the upper end of a container moved along by the conveyer in order that the cap will be withdrawn and loosely applied to the container. The sealing unit 3 is illustrated in detail in my co-pending application Serial No. 418,401, and includes a vertically reciprocable sealing head 3a.

The conveyer unit 1 may be of any suitable type but is shown as embodying an endless chain 6 passing around a driving sprocket unit 7 and an idler sprocket unit 8. The sprocket unit 7 is driven by an electric motor 9 and a gear unit 9a, supported on the under side of the table 1a, through the medium of a sprocket chain 10. The motor 9 drives the conveyer continuously. The conveyer will serve to successively move containers disposed thereon into association with the cap-applying unit 2 and then into association with the sealing unit 3. The units 2 and 3 are mounted for vertical adjustment as described in Serial No. 418,401 so that the machine can be used with containers of various heights.

As previously indicated, in order to prevent tipping of containers at the cap-applying unit 2 and at the sealing unit 3, I provide a holding belt arrangement for gripping the containers at these points. This holding belt arrangement consists of a set of holding belts 11 and a set of holding belts 12. The holding belt unit 11 is adapted to grip the containers as they withdraw caps from the unit 2 while the holding belt unit 12 is adapted to grip the containers while they are being sealed by the unit 3.

Figure 4:
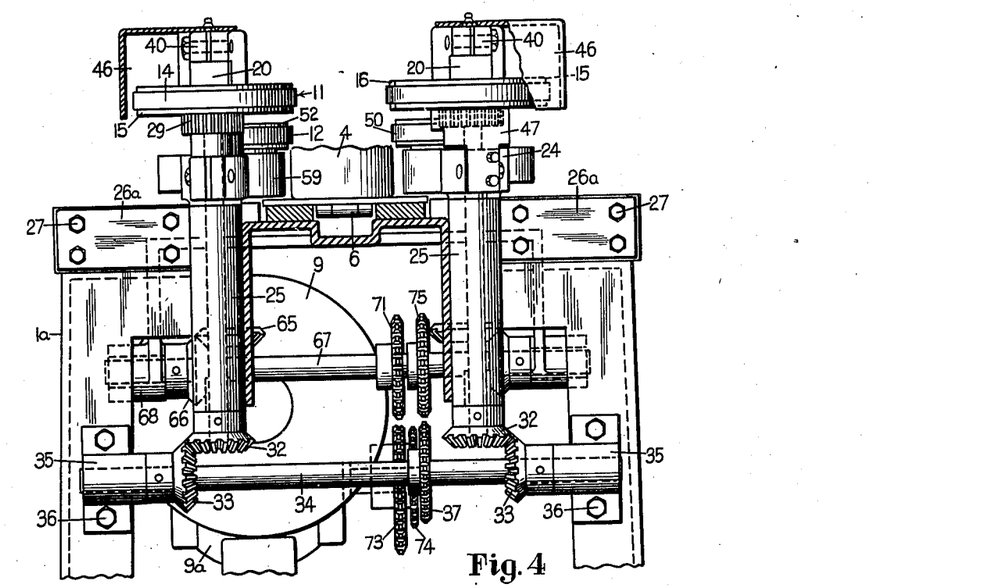
Figure 4 is a transverse vertical sectional view taken substantially along line 4—4 of Figure 1.
Figure 5:
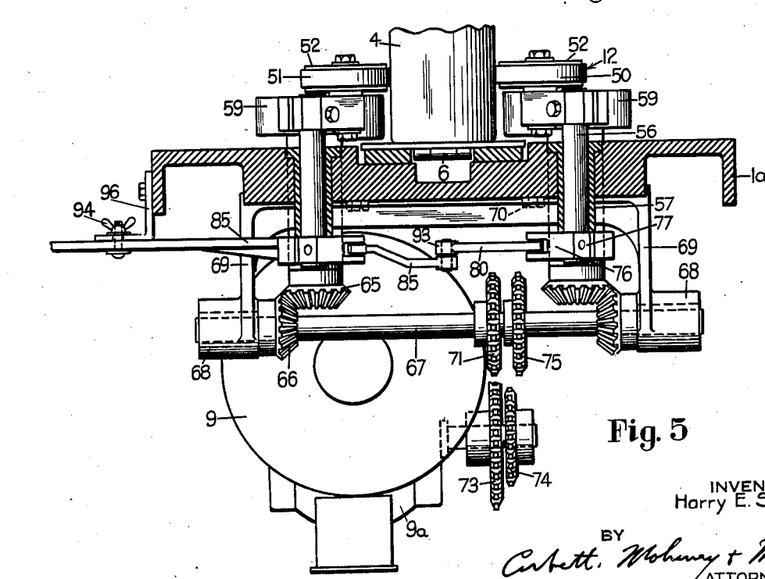
Figure 5 is a transverse vertical sectional view taken substantially along line 5—5 of Figure 1.
Figure 6:
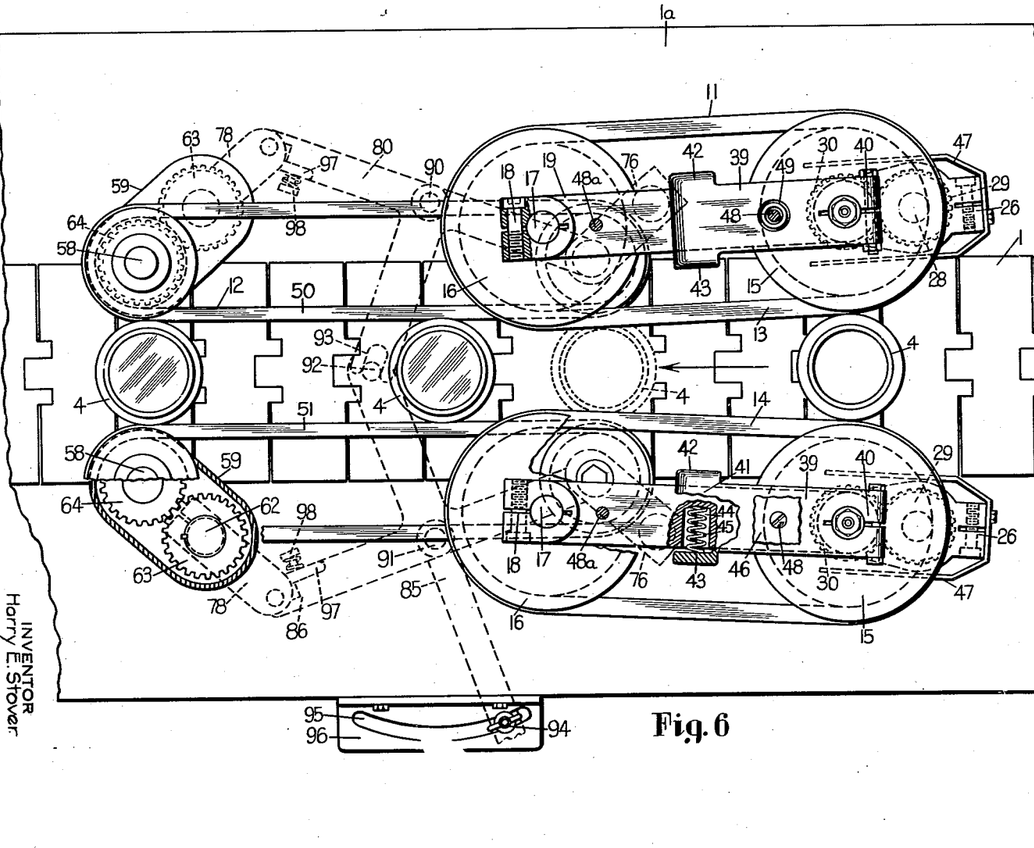
Figure 6 is a top plan view of my holding belt arrangement.

The holding belt unit 11 is illustrated best in Figures 3 to 6. As shown best in Figure 6, it comprises endless belts 13 and 14 which are composed of suitable flexible material which will frictionally engage the containers. As shown in Figure 6, the inner flights of the belts 13 and 14 are supported in such a manner that they converge toward each other in the direction of movement of the conveyer 1.

Each of the belts 13 and 14 is supported by a driving pulley 15 and an idler pulley 16. The pulley 16 (Figure 3) is rotatably supported by a pin 17 held by means of a clamp 18 on the outer or forward end of an arm 19. The rear end of this arm 19 is provided with vertically spaced bearing portions 20 and 21 which are rotatably supported by a vertical pin 22. The lower end of the pin 22 is non-rotatably held by a key 23 in a socket member 24. The socket member 24 is clamped to a vertically disposed sleeve 25 by means of a split clamp 26. The sleeve member 25 (Figure 4) is provided with an integral wing member 26a which is rigidly secured by bolts 27 to the rear side of the table 1a.

The sleeve 25 has a vertical shaft 28 (Figure 3) rotatably mounted therein. The upper end of this shaft 28 has a pinion 29 keyed thereon which rests on the upper end of sleeve 25 and which is disposed directly below pulley 15. The pinion 29 meshes with a pinion 30 which is rotatably mounted on pin 22. The pinion 30 is provided with an upwardly projecting sleeve portion 31 upon which the pulley 15 is keyed. Thus, it will be apparent that if shaft 28 is rotated, the pulley 15 will be driven and this will serve to drive the idler pulley 16 and the belt carried by said pulleys. The lower end of the shaft 28 has a bevel pinion 32 keyed thereon. As shown best in Figures 3 and 4, this pinion 32 meshes with a pinion 33 keyed on a horizontal shaft 34. The shaft 34 is rotatably supported by bearing members 35 which are secured by means of bolts 36 to the legs of the table 1a. The shaft 34 is driven by means of a sprocket 37 which is keyed thereon and which is driven by a sprocket chain 38.

Figure 3:
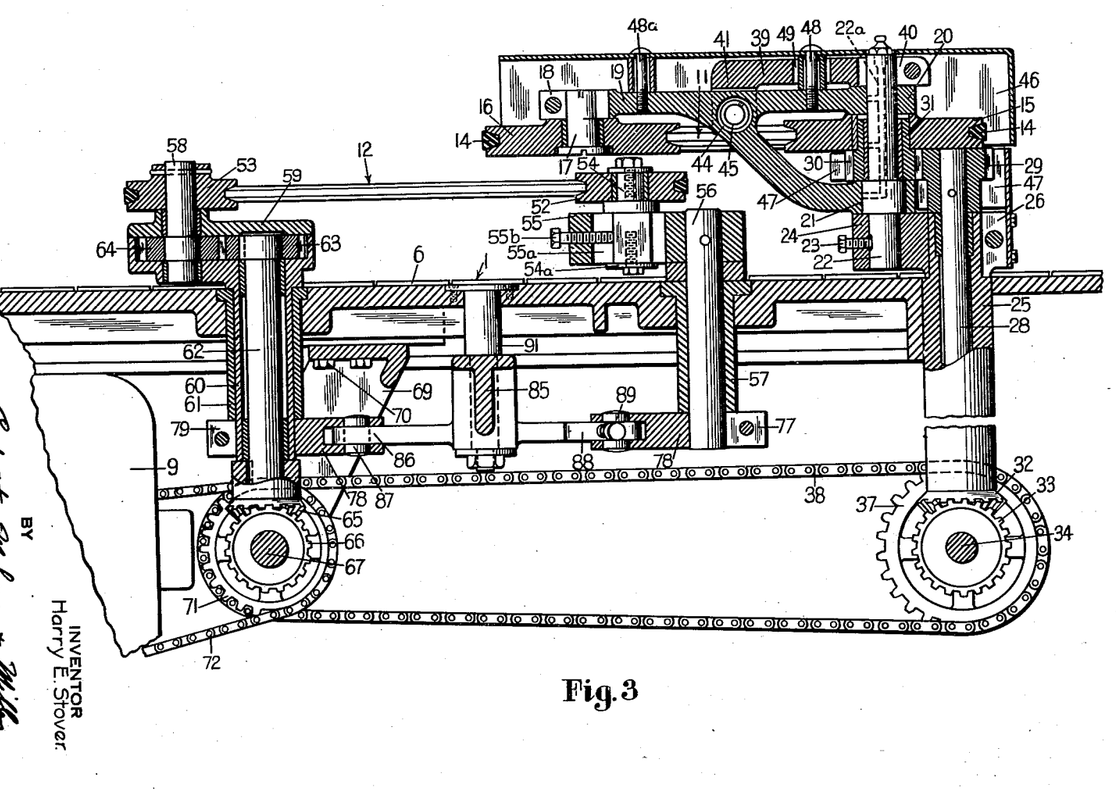
Figure 3 is a detail in longitudinal vertical section of my holding belt arrangement.

As shown in Figure 3, the pin 22 projects upwardly beyond the arm 19 and this projecting portion of the pin has an arm 39 clamped thereto by split clamping means 40. The outer or forward end of this arm 39 is provided with a yoke portion 41 which straddles the arm 19. Thus, the arm 19 is mounted for swinging movement about the axis of pin 22 while the arm 39 is immovably clamped to the pin 22. As shown best in Figure 6, the inner depending leg 42 and the outer depending leg 43 of yoke portion 41 are spaced apart a distance greater than the width of the arm 19. At the point where the yoke portion 41 straddles the arm 19, the arm is provided with a socket 44 in its outer side which receives a compressing spring 45. This spring has its outer end bearing against the leg 43 of the yoke portion. The spring 45 tends to force the arm 19 inwardly into contact with the stop member 42 at all times. In other words, the spring 45 tends to swing the arm 19 about the axis of pin 22 and, consequently, swings the forward end of arm 19 towards the center of the conveyer 1.

A guard housing 46 is preferably provided in covering relationship to the outer side portions and rear end portions of the pulleys 15 and 16 and the belt carried thereby, as shown in Figure 3. This guard housing 46 is secured to arm 19 by means of a screw and spacer unit 48a and a screw and spacer unit 48. The unit 48 extends through a slot 49 in member 39 to permit the relative movement of arms 19 and 39. A second housing member 47 is fastened to member 24 and serves to cover the pinions 29 and 30. The pin 22 has lubricant ducts 22a formed therein for supplying lubricant to bearing portions 20 and 21 on arm 19 and to the pinion 30.

The sleeves 25 are disposed directly adjacent the side edges of the conveyor 1 as shown best in Figure 4. The belts 13 and 14 at the entrance end of the unit 11 are spaced apart sufficiently to easily receive the particular container to be sealed by the machine. To obtain this, pulleys 15 must be spaced apart to the proper degree by loosening clamp members 26, swinging the members 24 about the axes of shafts 28 to the proper positions and then tightening the clamp members 26. The pulleys 16, or the belts 13 and 14 at the exit end of the unit 11, are spaced apart a distance slightly less than the diameter of the particular container to be sealed by the machine. This spacing may be readily adjusted by loosening the clamp members 40, swinging the arms 39 about the axes of pins 22, which in turn swing the arms 19 about the axes of pins 22 to the proper positions, and then clamping the clamp members 40. Thus, by means of these two adjustments, the lateral distances between pulleys 15 and between pulleys 16 can be set independently of each other, thereby producing any desired spacing at each pair of pulleys, and any desired angle of convergence of the arms 19 and 39 and belts 13 and 14. Although the pulleys 16 are spaced apart slightly less than the diameter of the container being sealed, the springs 45 will permit sufficient outward movement of the pulleys 16 to permit passage of the containers by the pulleys.

The diverging rear ends of belts 13 and 14 serve to guide the containers between these belts and since the belts 13 and 14 are driven in the same direction as the conveyor 1 and at the same linear speed, these containers will be gradually gripped between the belts as they are moved along by the conveyor. Because of this gradual gripping action, there is no danger of the containers being thrown rearwardly from the belt unit which might happen if the gripping action were sudden and positive. As shown best in Figures 6, 8 and 9, the cap-feeding unit 2 is disposed substantially in alignment with the pulley members 16. Therefore, as the container 4 withdraws the cap 5 from the unit 2 in the manner illustrated in Figure 9, the belt unit 11 has its maximum gripping action on the container. At this time the container has a tendency to tilt rearwardly as indicated by the dotted line arrow in Figure 9. However, the moving belt members 13 and 14 exert a force in the direction indicated by the full line arrow in Figure 9 and overcomes this tendency to tilt. The belts 13 and 14 not only serve to prevent rearward upsetting of the containers but also serve as guide members which cause the containers to be aligned laterally of the conveyor with the unit 2. It also prevents lateral tipping of the container.

Figure 7:
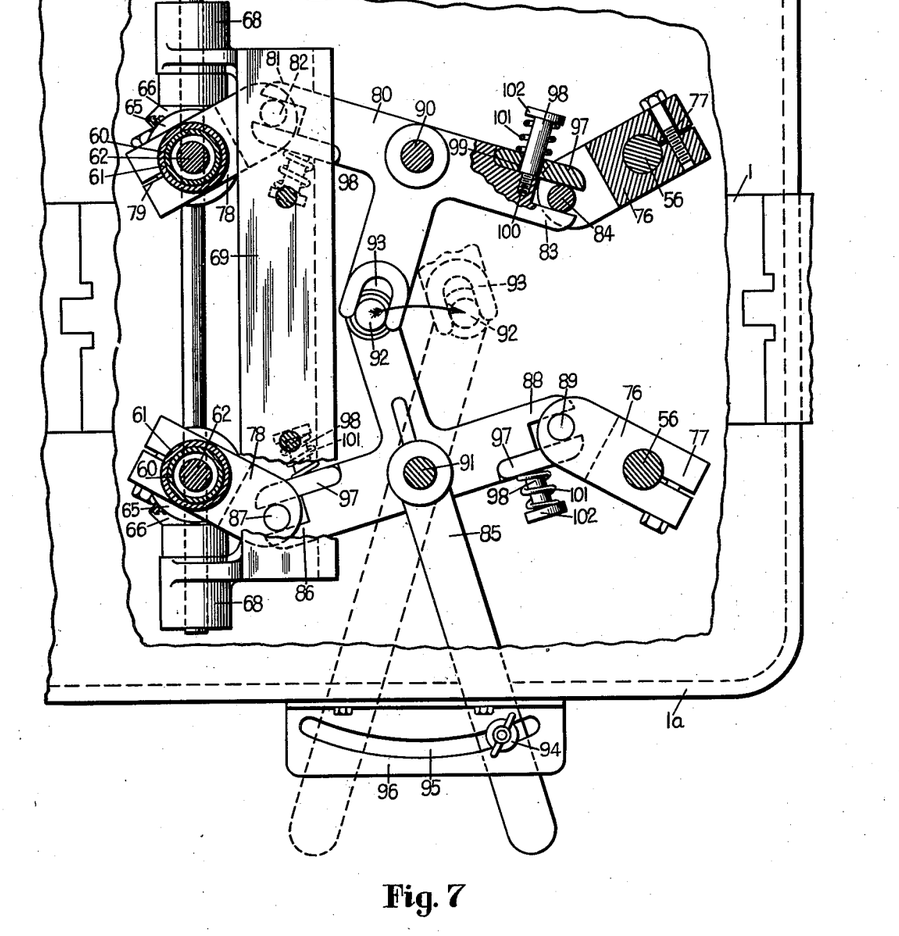
Figure 7 is a detail, partly in top plan view and partly in horizontal section, illustrating the adjusting means for the holding belt unit which is associated with the sealing unit.

The belt unit 12 is illustrated best in Figures 3, 6 and 7. It comprises a pair of endless belts 50 and 51 disposed adjacent opposite edges of the conveyor. Each of these belts is supported by a rear idler pulley 52 and a forward driving pulley 53. The rear pulley 52 is rotatably carried by a pin structure 54 which has a square lower portion that is carried in a slot 55a formed in member 55. Pin 54 may be moved along slot 55a to adjust the tension of belt 12 by means of a set screw 55b. Clamping means 54a is provided on the lower end of pin 54 to clamp the pin in adjusted position along slot 55a. This member 55 is in the form of a crank arm which is keyed to the upper end of a vertical shaft 56. The shaft 56 is rotatably mounted in a sleeve 57 which is non-rotatably mounted in an opening provided in the table 1 adjacent the edge of the conveyer as shown best in Figure 5. The pulley 53 is keyed on the upper end of a shaft 58 carried on the outer end of a crank arm structure 59. This crank arm structure has its inner end formed integral with a vertical sleeve 60 which is rotatably mounted in a bearing sleeve 61. The sleeve 61 is non-rotatably secured in an opening in the table 1 adjacent the edge of the conveyor as shown best in Figures 3 and 5. A vertical shaft 62 is rotatably disposed in the sleeve 60. This shaft 62 has a pinion 63 keyed on its upper end which engages a pinion 64 keyed on the lower end of shaft 58. The crank arm structure 59 serves as a housing for the pinions 63 and 64. When the shaft 62 is rotated, it serves to rotate shaft 58 and pulley 53. This, in turn, drives pulley 52 and the belt carried by the pulleys 52 and 53. The lower end of the shaft 62 has a beveled gear 65 keyed thereon. This gear 65 (Figure 5) meshes with a beveled gear 66 keyed on a horizontal shaft 67. The shaft 67 is rotatably mounted in bearing portions 68 carried by a supporting structure 69 which is secured by bolts 70 to the bottom of the table 1. The shaft 67 has a sprocket 71 keyed thereon which is driven by means of a sprocket chain 72 (Figures 2 and 3) that is driven by a sprocket 73 associated with the gear unit 9a (Figure 5). The gear unit 9a also has the sprocket 74 associated therewith which drives the chain 10 that drives the conveyer 1. The shaft 67 also has a sprocket 75 keyed thereon which drives the chain 38 that passes over sprocket 37.

Thus, the shaft 67 will serve to drive the pulleys 53 which will drive the belts 50 and 51 of unit 12. These belts will be driven in the same direction and at the same linear speed as the conveyer belt 1. As shown best in Figure 6, the crank arm structures 59 at the rear of the unit 12 are disposed in the same angular relationship to the conveyer 1 as the crank arm structures 55 at the front of the unit. I provide means for simultaneously adjusting all of these crank arm structures in order to move the pulleys 52 and 53 at one side of the conveyer toward or from the corresponding pulleys at the other side of the conveyer. In other words, I provide means for varying the spacing between the inner flights of the belts 50 and 51 in accordance with the different diameters of the containers being sealed by the machine.

This adjusting mechanism is illustrated best in Figures 3, 6 and 7. As shown, each of the shafts 56 is provided on its lower end with a crank arm 76 clamped thereto by means of a clamping portion 77. Each of the sleeves 60 has a crank arm 78 clamped thereto by a clamping portion 79. The crank arms 76 and 78 at one side of the conveyer are operatively connected together by a T-shaped lever member 80. This lever 80 has a bifurcated end portion 81 engaging a pin 82 carried on the free end of crank 78 and a bifurcated end portion 83 engaging a pin 84 carried on the free end of the crank 76. Similarly, the crank arm members 78 and 76 at the opposite side of the conveyer are connected together by a cross-shaped lever member 85. This lever member has a bifurcated arm portion 86 engaging a pin 87 carried on the outer end of crank arm 78 and a bifurcated portion 88 engaging a pin 89 carried on the outer end of crank arm 76. The T-shaped lever 80 is pivoted, as at 90, to the lower surface of table 1 while the cross-shaped lever 85 is pivoted, as at 91, to the lower surface of the table 1. The inner end of lever 85 carries a pin 92 which is disposed in a yoke portion 93 formed on the inner end of lever 80. The outer end of the lever 85 extends beyond the outer edge of the table forming a handle portion. This handle structure carries a clamping pin structure 94 which cooperates with an arcuate slot 95 formed in a plate 96 bolted to the edge of the table. The handle of lever 85 may be swung into any desired position, upon release of clamp 94, and may be held in such position by tightening the clamp. If desired, the plate 96 may be calibrated.

It will be apparent that when lever 85 is swung about the pivot 91, the crank arms 76 and 78 associated therewith will be swung in opposite directions. Furthermore, the lever 80 will be swung about the pivot 90 to move the crank arms 76 and 78, associated therewith, in opposite directions. Thus, the crank arms 76 and 78 at one side of the conveyer will be swung toward or away from the corresponding crank arm at the other side of the machine. This will rotate shafts 56 and sleeve 60 in the proper direction to simultaneously move the pulleys 52 and 53 at one side of the conveyer toward or away from the corresponding pulleys at the opposite side of the conveyer. Thus, the belts 50 and 51 will be adjusted toward or away from each other.

Each of the bifurcated portions 81, 83, 86 and 88 of levers 80 and 85 has one jaw portion 97 (Figure 7) resiliently mounted. This jaw portion 97 is held in place by a pin 98 fastened loosely through an opening 99 formed therein and threaded into the lever member as at 100. A spring 101 surrounds the pin 98 and has its outer end engaging a head 102 on the pin and its inner end engaging the jaw member 97. The jaw member 97 is thus normally held in position. The resiliently mounted jaw members 97 serve as a safety feature to prevent the unit 12 from gripping the containers passing therethrough so tightly that the containers would be crushed. For example, if the pulleys 52 and 53 at one side of the conveyer are adjusted too close to the pulleys 52 and 53 at the other side of the conveyer, so that there would be a tendency for the container to be crushed as it passed between these pulleys, the resilient jaw portions would permit slight movement of the crank arms 76 and 78 relative to the levers 80 and 85, with which they are associated, and consequently, would permit movement of the two pulleys 52 away from each other or the two pulleys 53 away from each other. Thus, I provide a structure wherein the pulleys are resiliently mounted in such a manner that a maximum gripping action on the containers by the belts 50 and 51 results but if this gripping action exceeds the predetermined maximum, the safety mechanism will function to prevent crushing of the containers.

As the containers leave the belts 13 and 14 of unit 11, they are already in position between belts 50 and 51 of unit 12 and will be gripped thereby. The containers will pass to the sealing unit 3 which includes the reciprocable sealing head 3a. This head 3a is disposed substantially in alignment with the pulleys 53 of the unit 12. When the sealing head 3a is moved downwardly by the mechanism described in my application Serial No. 418,401, the containers will be gripped between the sealing head and the conveyer 1, as shown in Figure 9. Since the container 1 is moving and the sealing head 3a does not move longitudinally therewith, there is a tendency for the container to be upset in the direction of the dotted line arrow in Figure 9. However, since the belts 50 and 51 are moving in the same direction as the conveyer and at the same speed and they grip the container intermediate the height thereof, they exert a force in the direction indicated by the full line arrow in Figure 9 and prevent tipping of the container. The unit 12 will have maximum gripping action adjacent the sealing unit 3 where it is needed. The belts 50 and 51 serve also to align the containers with the unit 3 and to prevent lateral tipping of the containers.

With my holding belt arrangement, the containers are prevented from tipping at the units 2 and 3. The holding belt units 11 and 12 are adjusted properly for the particular size of containers being sealed. The containers will feed between the belts 13 and 14 and the converging belts will gradually grip each container, the maximum gripping force being adjacent the unit 2. This gripping action will be gradual and resilient and there will be no danger of the containers being thrown rearwardly even though they might be wet and slippery. Before the containers leave the unit 11, they are gripped by the belts 50 and 51 of unit 12. As each container enters between the pulleys 52 of unit 12, it is still gripped by the belts 13 and 14 of unit 11. This will prevent the containers from being thrown rearwardly as they pass between pulleys 52. This is important especially if the containers are wet and slippery. Thus, the unit 11 serves as a guide structure for guiding the containers into the unit 12 and gripping them until they are effectively gripped by the unit 12.

Various other advantages will be apparent from the preceding description, the drawings and the following claims.

Having thus described my invention, what I claim is:

1. In combination, a conveyer for supporting containers, means for gripping containers carried by said conveyer to prevent tipping thereof, said means comprising endless belts disposed at opposite sides of the conveyer for gripping containers therebetween, said belts consisting of a forward pair and a rearward pair disposed at different levels with their adjacent ends overlapping, each of said forward pair of belts being disposed on supporting and driving pulleys carried by a pivoted arm, said arms being disposed in rearwardly converging relationship so that the belts carried thereby are disposed in such converging relationship, each of said rearward pair of belts being disposed on supporting and driving pulleys which are adjustably mounted, means for adjusting said arms which support the forward belts and means for adjusting said pulleys which support the rear belts in accordance with the size of the containers, and means for driving both of said pairs of belts at the same linear speed as the conveyer.

2. A structure according to claim 1 wherein the rear ends of said arms are resiliently urged toward each other.

3. A structure according to claim 1 wherein said arms are adjustable into different angular positions relative to each other.

4. A structure according to claim 1 wherein the rear ends of said arms are resiliently urged toward each other and wherein said arms are adjustble into different angular positions relative to each other.

5. A structure according to claim 1 wherein the pulleys for supporting the rear belts are carried by crank arms and wherein means is provided for simultaneously adjusting all of said crank arms.

6. A structure according to claim 1 wherein the rear ends of said arms are resiliently urged toward each other, wherein said arms are adjustable into different angular positions relative to each other, and wherein the pulleys for supporting the rear belts are carried by crank arms, means being provided for simultaneously adjusting all of said crank arms.

7. In combination a conveyer for supporting containers, means for gripping containers carried by said conveyer to prevent tipping thereof, said means comprising endless belts disposed at opposite sides of the conveyer for gripping containers therebetween, said belts consisting of a forward pair and a rearward pair disposed at different levels with their adjacent ends overlapping, said forward pair of belts being disposed in rearwardly converging relationship so as to gradually grip the containers and guide them into the rearward pair of belts, and means for driving both of said pairs of belts at the same linear speed as the conveyer.

8. A structure according to claim 7 wherein the rear ends of the forward belts are resiliently urged toward each other.

9. A structure according to claim 7 wherein means is provided for changing the angular relationship of the forward belts.

10. In combination a conveyer for supporting containers, means for gripping the containers carried by said conveyer to prevent tipping thereof, said means comprising endless belts disposed at opposite sides of the conveyer for gripping containers therebetween, a supporting structure for each of said belts, said supporting structure comprising an arm having one end pivotally carried by a vertical shaft, a yoke member carried by said shaft and having one end movably clamped thereto, said yoke member straddling said arm member to limit pivotal movement thereof, resilient means associated with said yoke member and said arm for normally urging the arm inwardly, a belt supporting and driving pulley carried by said shaft, a belt-supporting pulley carried by said arm, and driving connections between said driving pulley and said shaft.

11. A structure according to claim 10 wherein said driving means serves to drive the belts at the same linear speed as the conveyer.

12. In combination a conveyer for supporting containers, means for gripping the containers carried by said conveyer to prevent tipping thereof, said means comprising endless belts disposed at opposite sides of the conveyer for gripping containers therebetween, supporting and driving pulleys for each of said belts, said supporting and driving pulleys being carried by crank arms at the outer ends thereof, vertical shafts for supporting the inner ends of said crank arms, and means for rotating all of said shafts simultaneously to adjust said belts toward or from each other.

13. A structure according to claim 12 wherein said rotating means includes a flexible connection to prevent the containers from being gripped by said belts with a force greater than a predetermined maximum.

14. A structure according to claim 12 wherein the driving means serves to drive the belt at the same linear speed as the conveyer.

15. In combination a conveyer for supporting containers, means for gripping the containers carried by said conveyer to prevent tipping thereof, said means comprising endless belts disposed at opposite sides of the conveyer for gripping containers therebetween, a supporting structure for each of said belts, said supporting structure comprising an arm having one end pivotally mounted, an immovably supported stop structure associated with said arm, said stop structure including resilient means engaging said arm for normally urging it inwardly and a stop for contacting with said arm to limit said movement, a belt supporting and driving pulley associated with the pivoted end of said arm, a belt supporting pulley carried by the outer end of the arm, and means for driving said driving pulley.

16. A structure according to claim 15 wherein the stop structure is mounted for pivotal adjustment about the pivot point of the arm.

17. In combination a conveyer for supporting containers, means for gripping the containers carried by said conveyer to prevent tipping thereof, said means comprising endless belts disposed at opposite sides of the conveyer for gripping containers therebetween, a supporting structure for each of said belts, said supporting structure comprising a vertically disposed pin, an arm having one end pivotally carried by said pin, a yoke member having one end mounted for adjustment on said pin about the axis thereof, said yoke member straddling said arm member to limit pivotal movement thereof, resilient means associated with said yoke member and said arm for normally urging the arm inwardly, a belt supporting and driving pulley carried by said pin, a belt supporting pulley carried by said arm, and means for driving said driving pulley.

18. A structure according to claim 17 wherein the driving means includes a vertical shaft the axis of which is spaced from the axis of said pin, said pin being supported for adjustment about the axis of said shaft.

19. A structure according to claim 17 wherein the driving means includes a vertical rotatable shaft the axis of which is spaced from the axis of said pin, a pinion carried by said shaft, and a pinion carried by said pin in driving engagement with the first-mentioned pinion, said second-mentioned pinion being secured to said driving pulley so that it will rotate therewith.

20. A structure according to claim 17 wherein the driving means embodies a vertical rotatable shaft the axis of which is spaced from the axis of said pin, said pin being supported for adjustment about the axis of said shaft, a pinion carried by said shaft, and a pinion carried by said pin in driving engagement with the first-mentioned pinion, said second-mentioned pinion being secured to said driving pulley so that it will rotate therewith.

21. In combination a conveyer for supporting containers, means for gripping the containers carried by said conveyer to prevent tipping thereof, said means comprising endless belts disposed on opposite sides of the conveyer for gripping containers therebetween, a supporting and driving structure for each of said belts, said supporting and driving structure comprising vertical shafts spaced apart longitudinally of the conveyer, one of said shafts being rotatably mounted, a crank arm keyed on the upper end of said shaft, said crank arm having an idler pulley rotatably mounted on its outer end for supporting the belt, the other shaft being a drive shaft supported for rotation within a vertically disposed bearing sleeve, said sleeve being mounted within a bearing for rotation, a crank arm carried on the upper end of the sleeve for rotation therewith, said crank arm having a driving pulley rotatably mounted on its outer end for supporting and driving the belt, a driving connection between said driving pulley and said last-named shaft, means for driving said last-named shaft and means for rotating the first-named shaft and said sleeve simultaneously to swing said crank arms and move the pulleys in or out.

22. A structure according to claim 21 wherein the first-named crank arm supporting the idler pulley is provided with means for adjusting the pulley along the crank arm.

23. A structure according to claim 21 wherein the second-named crank arm carries a shaft on its outer end upon which said driving pulley is mounted, a pinion carried by said shaft, and a pinion carried by said drive shaft in engagement with said first-named pinion.

24. A structure according to claim 21 wherein means is provided for rotating simultaneously said first-named shaft and said sleeve of the supporting and driving structures provided for said belts to move said belts simultaneously toward or away from each other.

25. A structure according to claim 21 wherein said sleeve and said first-named shaft carry crank arms on their lower ends, and means for swinging all of said crank arms simultaneously to move the belts simultaneously toward or away from each other.

26. A structure according to claim 21 wherein said sleeve and said first-named shaft carry crank arms on their lower ends, means for swinging all of said crank arms simultaneously to move the belts simultaneously toward or away from each other, said means comprising a plurality of pivoted levers, said levers being connected to each of the crank arms by means of a flexible connection which yields to prevent the containers from being gripped by said belts with a force greater than a predetermined maximum.

HARRY E. STOVER.